United States Patent
Wilkinson

[15] 3,637,222
[45] Jan. 25, 1972

[54] SEALS

[72] Inventor: Samuel Clifford Walter Wilkinson, Cookham, England

[73] Assignee: Crane Packing Limited, Slough, Buckinghamshire, England

[22] Filed: Jan. 27, 1970

[21] Appl. No.: 6,141

[30] Foreign Application Priority Data

Feb. 5, 1969 Great Britain..................6,116/69

[52] U.S. Cl................................277/34, 277/152
[51] Int. Cl...........................................F16j 15/46
[58] Field of Search....................277/34, 34.6, 152

[56] References Cited

UNITED STATES PATENTS 2,825,589  3/1958  Richardson et al.....................277/34
2,841,422  7/1958  Badger.....................................277/34
3,516,679  6/1970  Schmitt....................................277/51

FOREIGN PATENTS OR APPLICATIONS 776,205  6/1957  Great Britain..........................217/34

Primary Examiner—Samuel B. Rothberg
Attorney—Scrivener, Parker, Scrivener and Clarke

[57] ABSTRACT

In a seal assembly comprising a lip seal which is mounted in a housing so that the lip portion of the seal for contacting a rotatable member is free to flex, the lip portion is urged into contact with the rotating member by a force applied through an annular inflatable member filled with a fluid under a pressure that may be varied to alter the applied force.

5 Claims, 4 Drawing Figures

SEALS

This invention relates to seal assemblies embodying lip seals for rotatable shafts, or for sliding members such as piston rods, and it is of particular interest for the sealing of ships' stern tubes.

Synthetic rubber lip seals have been well established for application on marine stern tubes, but in the case of the larger shaft sizes they have not proved to be completely satisfactory because they rely on a preset spring load, using a helical coil tension spring forming a loop around the lip, to press the lip onto the wearing sleeve on the shaft, and it is impossible to adjust the spring load to suit the conditions of operation, which vary considerably from the early stages of running to a settled down condition. There is a tendency for the lip to seal too well when first installed, but after a few hours of running local overheating occurs, which vulcanizes the material and hardens it in some cases or, with some types of rubber, the overheating softens it, and both these variations call for a change in the applied spring load to maintain consistent operation.

The aim of the present invention is to provide an arrangement which makes such a variation of the load on the lip a practical proposition, while at the same time making possible a fully split assembly which calls for no special adhesive or vulcanizing procedure during installation.

Accordingly, the present invention consists in a seal assembly comprising a lip seal mounted in a housing or the like so that a lip portion of the seal for contacting a rotatable member is free to flex, and an annular inflatable member acting on the lip portion to urge it into such contact with a force that may be altered, the annular inflatable member being filled with a fluid under a pressure that can be varied to alter the force.

By adjustment of the inflation pressure the force with which the lip is pressed into contact with the shaft can be controlled. The fluid can be a liquid or a gas, for example, water, oil, air or carbon dioxide.

Preferably, the lip seal is of L-shape in section with one limb extending radially to the rotatable member and secured in the housing or the like, and with the other limb constituting the lip portion extending axially to the rotatable member. The radially extending limb would be clamped between cooperating faces of components of the housing or the like.

The radially innermost face of the lip portion has a raised rib for contacting the rotatable member, and the opposed face of the lip portion is engaged by the inflatable member.

The inflatable member is of U-shape in section with its free ends secured in the housing alongside the radial limb of the lip seal. Both the inflatable member and the lip member are cut from lengths of profiled strip slightly greater than the circumferential lengths of the recesses in which they are to be received, so that when located they are under circumferential compression; their butting ends are cut accurately to ensure even stress over the whole contact area.

It will be understood that the lip member may be manufactured from a material having ideal characteristics for resisting wear and heat, while the inflatable member can be manufactured from a material best suited to resist cracking or failure due to stresses that arise when it is inflated. Rubber and plastics are both suitable materials.

Where the invention is applied to a marine stern tube provision can be made for adjusting the force applied to the lip portion according to the loaded condition of the ship, since this condition controls the static head of water to which the seal is subjected. Oil under pressure may be taken from the stern tube bearing lubricating system through a control valve, or air may be taken either from the ship's installed compressed air system or from a separate air reservoir. A simple pressure warning device can be incorporated in the pressure system as a safeguard against loss of sealing efficiency in the event of loss of pressure or damage to the system.

By way of example, one embodiment of the invention will now be described with reference to the accompanying drawing wherein.

Figure 1:
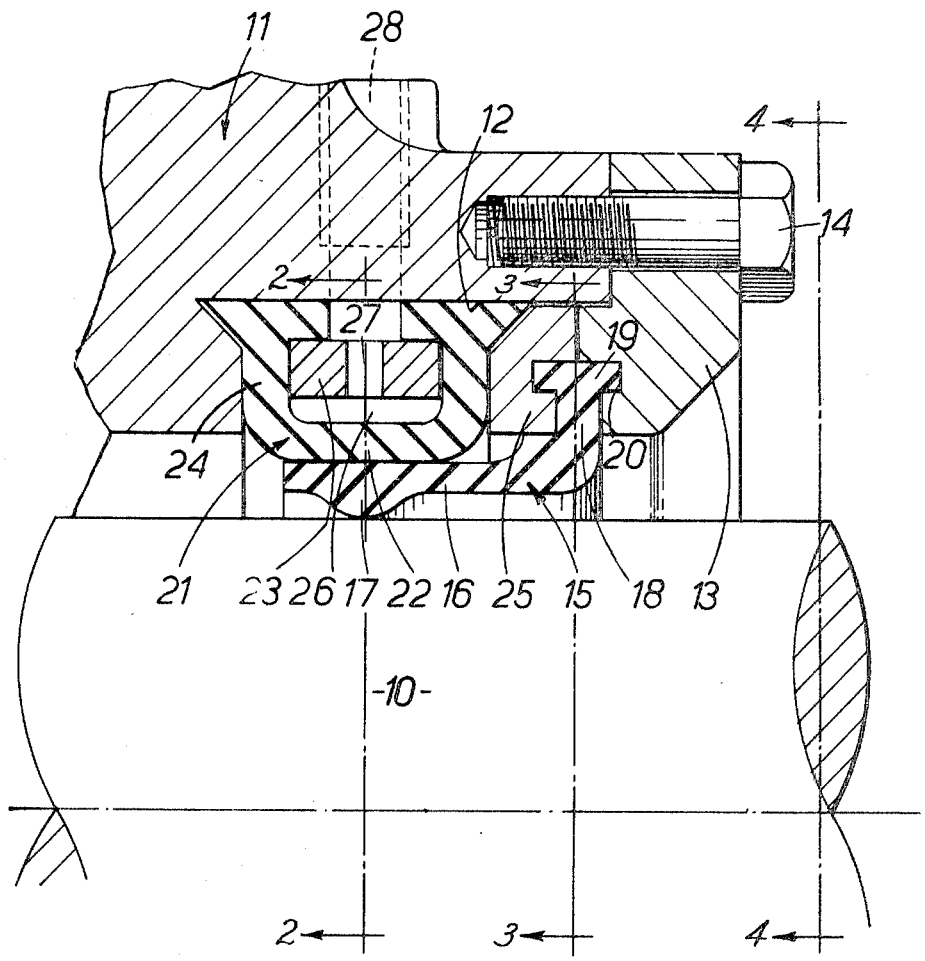
FIG. 1 is a section through a seal assembly in accordance with the invention.

A shaft 10 is mounted for rotation in a housing 11 having a recess 12 in which the seal assembly is mounted by means of an end cover 13 detachably secured to the housing 11 by bolts 14.

The seal assembly comprises an annular lip seal 15 having a lip portion 16 extending axially to the shaft 10 and formed with a rib 17 in contact with the shaft 10. The other limb 18 of the lip seal 15 terminates in a flange 19 of which one edge is received in a groove 20 in the end cover 13 to secure and locate the lip seal in position and permitting flexing of the lip portion 16.

An inflatable member 21 of U-shape in section is secured in the housing recess 12 so that the base portion 22 abuts against the radially innermost face of the lip portion 16. A metal support ring 23 is received within the inflatable member 21 to stiffen and prevent inward collapse of the sidewalls 24 of the inflatable member 21. The free ends of the walls 24 are lipped and engage with the housing recess to seal the inflatable member 21 thereto.

A metal spacer 25 is interposed between the outermost wall 24 of the inflatable member 21 and the radial limb of the lip seal 15. The other edge of the flange 19 of the lip seal 15 is received within a groove in the spacer 25 to locate the lip seal 15, and the spacer 25 also engages with the underside of the lipped free end of the outermost sidewall 24 of the inflatable member 16 to locate and secure it in position.

The interior 26 of the inflatable member 16 is in communication with a suitable supply of pressure fluid through an orifice 27 formed in the supporting ring 23 and a passageway 28 provided in the housing 11.

Figure 2:
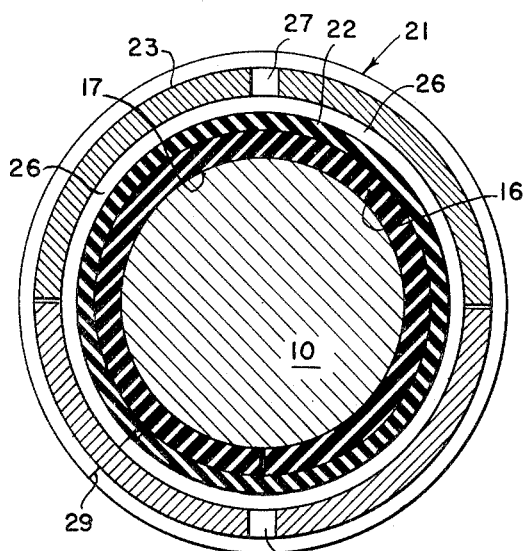
FIG. 2 is a vertical cross-sectional view taken substantially on the line 2—2 of FIG. 1.
Figure 3:
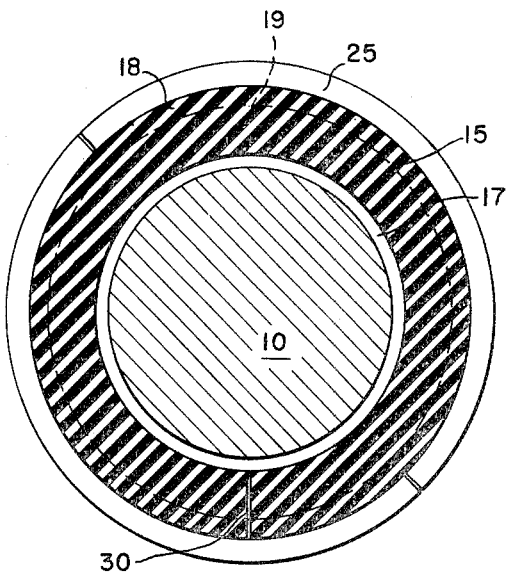
FIG. 3 is a vertical cross-sectional view taken substantially on the line 3—3 of FIG. 1.
Figure 4:
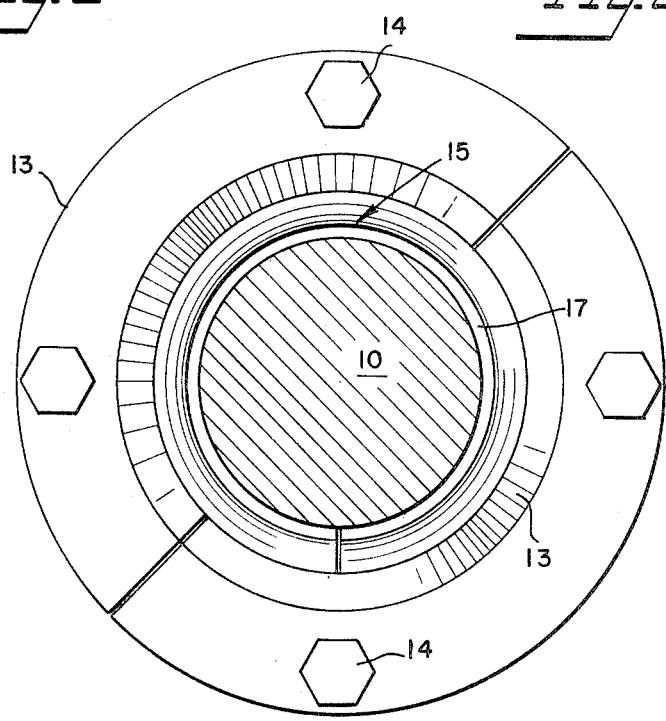
FIG. 4 is a vertical cross-sectional view taken substantially on the line 4—4 of FIG. 1.

The inflatable member 16 and the lip seal 15 are both formed from profiled strips of resilient material circumferentially compressed with their respective ends abutting as shown at 29, 30 respectively, in FIGS. 2 and 3. The metal support ring 23, the spacer 25 and the end cover 13 are each split into two or more segments as shown in FIGS. 2, 3 and 4. So that the entire seal assembly may be assembled or removed without requiring access to a free end of the shaft.

AS can readily be appreciated, the pressure fluid in the interior 26 of the inflatable member 16 will cause the base portion 22 to apply a load to the lip portion 16 of the seal 15. By varying the pressure of the fluid, the loading on the lip portion 16 may be altered in accordance with prevailing conditions.

I claim:

1. In an installation including a rotatable member and a housing having an annular recess therein, the provision of a seal assembly comprising an inflatable annular member seated within the recess in said housing and in communication with means for supplying fluid at variable pressures, said inflatable member being retained by an annular spacing member, said spacing member providing a seating for an annular lip seal, said lip seal having a first limb extending radially with respect to said rotatable member and engaging said seating, and a second limb constituting a flexible lip portion extending axially with respect to said rotatable member and urged into engagement with said rotatable member by said inflatable member, said lip seal being retained in said seating by an end cover detachably secured to said housing, said inflatable member and said lip seal each comprising a length of profiled strip formed of a resilient material having abutting ends and retained under circumferential compression, and said spacing member and said end cover each being segmentally divided whereby said seal assembly way be dismantled with said rotatable member in situ in said housing.

2. In the installation of claim 1 including a flange carried by said first limb, said flange having a pair of limbs extending axially therefrom in opposite directions with respect to said shaft, and complementary grooves in said spacing member and in said end cover respectively engaging the axially extending limbs of said flange.

3. In the installation of claim 1 including tapering flanges on the radially outer edges of the opposite, axially spaced sides of said inflatable member, and complementary seatings in said housing and on said spacing member respectively wedgingly engaging said flanges whereby said inflatable member is urged into fluidtight engagement with said recess.

4. The installation as set forth in claim 1 wherein said inflatable annular member is of U-shape in section with the base portion engaging said other face of said second limb, and with the free ends secured in said housing.

5. The installation as set forth in claim 4 wherein a supporting ring is received within said inflatable annular member.

* * * * *